US008110808B2

(12) United States Patent
Frank

(10) Patent No.: US 8,110,808 B2
(45) Date of Patent: Feb. 7, 2012

(54) FLOATING INTELLIGENT PERIMETER SENSOR SYSTEM

(75) Inventor: David L. Frank, Boca Raton, FL (US)

(73) Assignee: Innovative American Technology, Inc., Coconut Creek, FL (US)

(*) Notice: Subject to any disclaimer, the term of this patent is extended or adjusted under 35 U.S.C. 154(b) by 430 days.

(21) Appl. No.: 12/472,707

(22) Filed: May 27, 2009

(65) Prior Publication Data

US 2009/0299694 A1    Dec. 3, 2009

Related U.S. Application Data

(63) Continuation-in-part of application No. 11/564,193, filed on Nov. 28, 2006, now Pat. No. 7,851,766, which is a continuation-in-part of application No. 11/291,574, filed on Dec. 1, 2005, now Pat. No. 7,592,601, which is a continuation-in-part of application No. 10/280,255, filed on Oct. 25, 2002, now Pat. No. 7,005,982, application No. 12/472,707, which is a continuation-in-part of application No. 11/852,835, filed on Sep. 10, 2007, now Pat. No. 7,668,681, which is a continuation-in-part of application No. 11/624,089, filed on Jan. 17, 2007, now Pat. No. 7,269,527.

(60) Provisional application No. 61/128,947, filed on May 27, 2008, provisional application No. 60/347,997, filed on Oct. 26, 2001.

(51) Int. Cl.
*G01T 3/08* (2006.01)

(52) U.S. Cl. ............ 250/370.05; 250/370.09; 250/336.1

(58) Field of Classification Search ............... 250/336.1, 250/370.05, 370.09; 702/127
See application file for complete search history.

(56) References Cited

U.S. PATENT DOCUMENTS 4,158,773 A    6/1979    Novak
(Continued)

FOREIGN PATENT DOCUMENTS

KR    10-1992-7004134    12/1992
(Continued)

OTHER PUBLICATIONS

Arni Heller; Smart Buoys Help Protect Subrarine Base; Jan. Feb. 2004; Lawrence Livermore National Laboratory;pp.19-22.*
(Continued)

*Primary Examiner* — David Porta
*Assistant Examiner* — Djura Malevic
(74) *Attorney, Agent, or Firm* — Jose Gutman; Fleit Gibbons Gutman Bongini & Bianco PL

(57) ABSTRACT

A system, method, and floating intelligent perimeter sensor, provide protection for waterways and critical infrastructures. The system and method utilize one or more floating intelligent perimeter sensors to detect, and in some cases identify, hazardous materials associated with vessels in the waterways. The hazardous materials detected, and optionally identified, can include radiological materials, fissile materials, explosives, chemicals and biological materials (CBRNE). A set of radiation data associated with a radiation source in a vessel is received from the one or more floating intelligent perimeter sensors. At least one histogram is generated based on the set of radiation data. The at least one histogram is compared to multiple spectral images associated with known materials. The at least one histogram is determined to substantially match at least one of the multiple spectral images. A determination is made whether a material associated with the radiation source is a hazardous material.

23 Claims, 5 Drawing Sheets

U.S. PATENT DOCUMENTS

| | | | |
|---|---|---|---|
| 4,799,828 | A | 1/1989 | Georgii |
| 5,056,958 | A | 10/1991 | Campbell |
| 5,241,573 | A | 8/1993 | Thacker |
| 5,633,508 | A | 5/1997 | Schleppenbach |
| 5,665,970 | A | 9/1997 | Kronenberg et al. |
| 5,838,759 | A | 11/1998 | Armistead |
| 6,370,222 | B1 | 4/2002 | Cornick |
| 6,433,335 | B1 | 8/2002 | Kronenberg et al. |
| 6,479,826 | B1 | 11/2002 | Klann et al. |
| 6,545,281 | B1 | 4/2003 | McGregor et al. |
| 6,845,873 | B1 | 1/2005 | Chattey |
| 6,891,470 | B2 | 5/2005 | Bohinc |
| 6,937,692 | B2 | 8/2005 | Johnson |
| 6,980,483 | B2 | 12/2005 | McDonald |
| 6,998,617 | B2 | 2/2006 | D'Emilio et al. |
| 7,026,944 | B2 | 4/2006 | Alioto et al. |
| 7,030,755 | B2 | 4/2006 | Bohinc |
| 7,064,336 | B2 | 6/2006 | Archer et al. |
| 7,116,235 | B2 | 10/2006 | Alioto et al. |
| 7,151,447 | B1 | 12/2006 | Willms et al. |
| 7,183,554 | B2 | 2/2007 | Gallagher et al. |
| 7,356,115 | B2 | 4/2008 | Ford et al. |
| 2002/0175291 | A1 | 11/2002 | Reeder et al. |
| 2003/0108150 | A1 | 6/2003 | Franke |
| 2003/0144800 | A1 | 7/2003 | Davis et al. |
| 2003/0165211 | A1 | 9/2003 | Grodzins et al. |
| 2003/0201394 | A1 | 10/2003 | Peoples |
| 2004/0018060 | A1 | 1/2004 | Knezek et al. |
| 2004/0119591 | A1 | 6/2004 | Peeters |
| 2004/0126895 | A1 | 7/2004 | Overbeck et al. |
| 2004/0148137 | A1 | 7/2004 | Zerwekh et al. |
| 2005/0011849 | A1 | 1/2005 | Chattey |
| 2005/0023477 | A1 | 2/2005 | Archer et al. |
| 2005/0082485 | A1 | 4/2005 | Tatsuo |
| 2005/0156734 | A1 | 7/2005 | Zerwekh et al. |
| 2005/0205793 | A1 | 9/2005 | Bohinc |
| 2005/0220247 | A1 | 10/2005 | Ruddy et al. |
| 2005/0258372 | A1 | 11/2005 | McGregor et al. |
| 2005/0275545 | A1 | 12/2005 | Alioto et al. |
| 2006/0097171 | A1 | 5/2006 | Balchunas et al. |
| 2006/0138331 | A1 | 6/2006 | Guillebaud et al. |
| 2006/0284094 | A1 | 12/2006 | Inbar |
| 2007/0001123 | A1 | 1/2007 | Andrews et al. |

FOREIGN PATENT DOCUMENTS

| | | | |
|---|---|---|---|
| KR | 10-1005-0067392 | | 7/2005 |
| WO | WO98-00681 | | 11/1998 |
| WO | WO2006-085999 | | 8/2006 |

OTHER PUBLICATIONS

U.S. Appl. No. 11/291,574, filed Dec. 2005, Frank.
U.S. Appl. No. 11/363,594, filed Feb. 2, 2006, Frank.
U.S. Appl. No. 11/564,193, filed Nov. 2006, Frank.
U.S. Appl. No. 11/931,370, filed Oct. 10, 2007, Frank.
International Preliminary Report on Patentabiilty for PCT/US06/46255 mailed Sep. 24, 2008.
International Search Report and Written Opinion of the International Searching Authority for PCT/US06/46255 mailed Sep. 25, 2007.
Written Opinion of the International Searching Authority for PCT/US07/085578 dated Jan. 23, 2009.
International Search Report for PCT/US07/085578 dated Jan. 23, 2009.
PCT Application No. PCT/US2007/085578 filed Nov. 27, 2007.
PCT Application No. PCT/US2006/46255 filed Nov. 30, 2006.
Non-Final Rejection for U.S. Appl. No. 11/291,574 dated Dec. 2, 2008.
Final Rejection for U.S. Appl. No. 11/291,574 dated Mar. 20, 2008.
Notice of Allowance for U.S. Appl. No. 11/291,574 dated May 20, 2009.
Non-Final Rejection for U.S. Appl. No. 11/363,594 dated Aug. 23, 2006.
Notice of Allowance for U.S. Appl. No. 11/363,594 dated Sep. 27, 2006.
Non-Final Rejection for U.S. Appl. No. 11/564,183 dated Jun. 25, 2009.
Non-Final Rejection for U.S. Appl. No. 11/931,370 dated Dec. 12, 2008.
Final Rejection for U.S. Appl. No. 11/931,370 dated Sep. 9, 2009.
Final Rejection for U.S. Appl. No. 11/564,193 dated Jan. 8, 2010.
Notice of Allowance for U.S. Appl. No. 11/930,229 dated Apr. 7, 2010.
International Search Report and Written Opinion for PCT/US09/050299 dated Mar. 3, 2010.
Notice of Allowance for U.S. Appl. No. 11/931,370 dated Mar. 30, 2010.
International Search Report for PCT/US09/038064 dated Jul. 31, 2009.
International Search Report and Written Opinion for PCT/US09/044486 dated Dec. 23, 2009.
International Search Report and Written Opinion for PCT/US09/044475 dated Jan. 6, 2010.
International Search Report and Written Opinion for PCT/US09/045268 dated Jan. 29, 2010.
International Search Report and Written Opinion for PCT/US09/044494 dated Jan. 18, 2010.
Non-Final Rejection for U.S. Appl. No. 11/931,211 dated Apr. 30, 2010.
International Search Report and Written Opinion for PCT/US2009/045268 dated Jan. 29 2010.

\* cited by examiner

FLOATING INTELLIGENT PERIMETER SENSOR SYSTEM

CROSS-REFERENCE TO RELATED APPLICATIONS

This application is based on and claims priority to provisional U.S. Patent Application No. 61/128,947, entitled "Floating Intelligent Perimeter Sensor", filed on May 27, 2008, and is also a continuation-in-part of and claims priority from, prior co-pending U.S. patent application Ser. No. 11/564,193 entitled "Multi-Stage System for Verification of Container Contents", filed on Nov. 28, 2006, which is a continuation-in-part of, and claims priority from, prior U.S. patent application Ser. No. 11/291,574, filed on Dec. 1, 2005, which is a continuation-in-part of, and claims priority from, prior co-pending U.S. patent application Ser. No. 10/280,255, filed on Oct. 25, 2002, now U.S. Pat. No. 7,005,982 issued on Feb. 28, 2006, and that was based on prior U.S. Provisional Patent Application No. 60/347,997, filed on Oct. 26, 2001; and this application is also a continuation-in-part of and claims priority from, prior co-pending U.S. patent application Ser. No. 11/852,835 entitled "Distributed Sensor Network With A Common Processing Platform For CBMRNE Devices And Novel Applications", filed on Nov. 28, 2006, which is a continuation-in-part of U.S. patent application Ser. No. 11/624,089 filed on Jan. 17, 2007, entitled "System Integration Module For CBRNE Sensors", now U.S. Pat. No. 7,269,527; the collective entire disclosure of which being hereby incorporated by reference.

FIELD OF THE INVENTION

The present invention generally relates to the field of sensors and detectors for detection of hazardous materials such as radiological materials, fissile materials, explosives, chemicals and biological materials (CBRNE), and more particularly relates to a floating perimeter sensor system deployed as part of waterways surveillance for detecting, and optionally identifying, hazardous materials about the floating perimeter sensors.

BACKGROUND OF THE INVENTION

Hazardous material detection is an integral part of safeguarding our well being from the threats of domestic and foreign terror. Current perimeter protection systems for critical infrastructures that reside on harbors and waterways do not integrate chemical, biological, radiation, nuclear, and explosives CBRNE sensors. The need for early warning sensor devices in protection of critical infrastructures such as nuclear power plants, oil refineries, oil terminals and city front areas is important in protection against terrorist attacks.

Therefore a need exists to overcome these problems as discussed above.

SUMMARY OF THE INVENTION

According to one embodiment of the present invention, one or more floating intelligent perimeter sensors (FIPS) are configured as part of a sensor network, which can optionally be deployed as part of a sensor network applied in conjunction with a waterway perimeter barrier system. The FIPS have one or more sensors of hazardous materials. The sensors are integrated into their FIPS structure and deployed using at least one "Sensor Integration Unit" such as described in U.S. Pat. No. 7,269,527. The FIPS may utilize a wide variety of data transmission methods such as Ethernet, Fiber Optics or wireless technologies for communications of sensor and alarm data and remote communications with the FIPS.

One embodiment of the invention comprises the deployment of one or more gamma and neutron detectors in each of one or more FIPS, and the deployment of these sensor systems along water channel or waterway choke points. The FIPS system could also be inserted into a line-up of floating devices used as a perimeter barrier. The FIPS units include sensors and/or detectors that can be used to inspect boats or vessels in a detection area about the FIPS units. Certain sensors in the FIPS are designed utilizing materials with scintillation detection for the presence of gamma and neutron materials. The FIPS gamma detectors may also provide spectral data for processing and analysis to determine the specific isotope that is present. The FIPS gamma radiation detectors and neutron radiation detectors can be used to detect and identify radioactive and/or fissile materials present in a detection area about the FIPS detectors. Each of the FIPS devices deployed could utilize Ethernet connections or wireless communications in an ad-hoc network configuration to relay the information between the FIPS devices, to a remote processor or from a remote processor to an individual FIPS device. Each FIPS device would have a specific TCP/IP address and could also have a GPS positioning system for FIPS device identification. The FIPS flotation sensor system could have self-container power or could be configured to have a power line extended to the system from an external power source.

The detection of radiation of fissile materials could indicate the presence of a dirty bomb. The identification of the specific isotope(s) that are present allows the FIPS system to more accurately identify the potential threat.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

Figure 1:
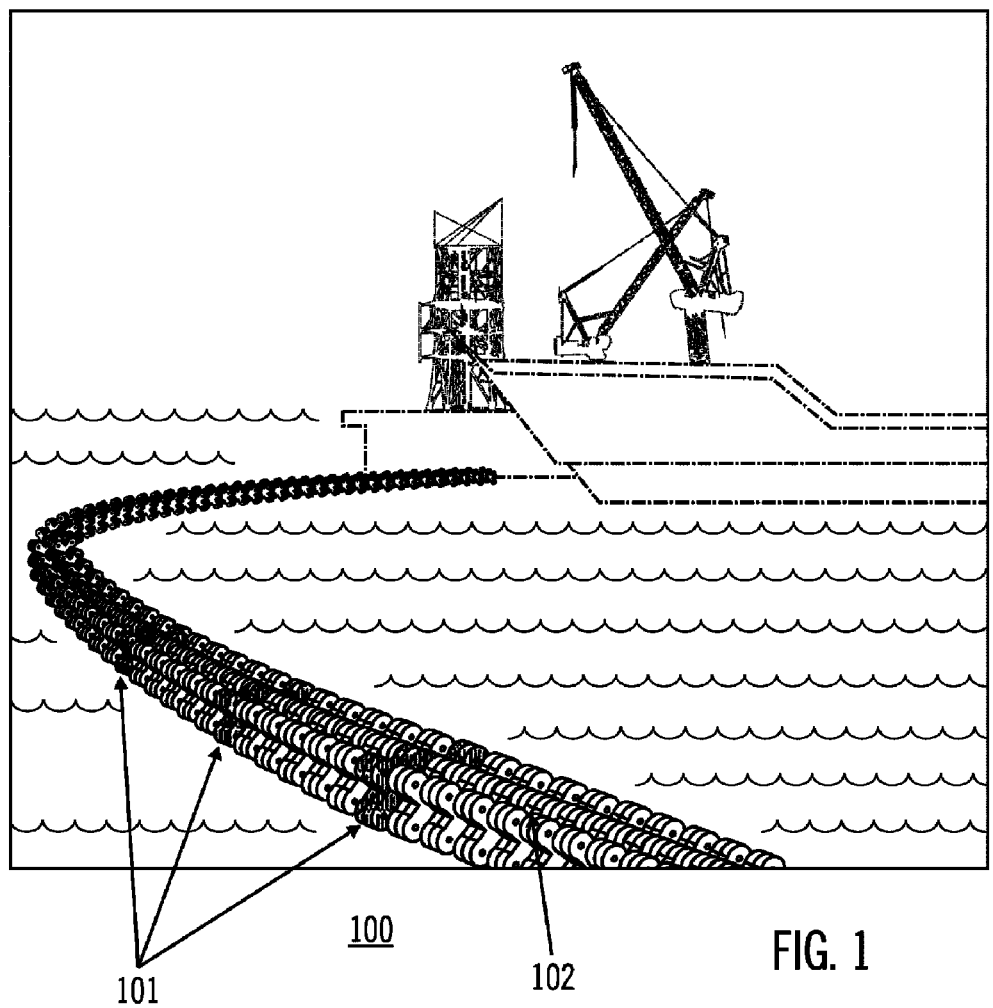
FIG. 1 is a pictorial representation of one example use of flotation devices for perimeter security with intelligent perimeter sensors units dispersed as part of a barrier, according to one embodiment of the present invention.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms "sensor" and "detector" are used herein interchangeably.

The terms "program", "computer program", "software application", and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such as RAM, buffers, cache memory, and network circuits are contemplated to serve as such data storage means according to different embodiments of the present invention.

The present invention, according to one embodiment, overcomes problems with the prior art by providing a Floating Intelligent Perimeter Sensor (FIPS) that can be deployed as one or more buoys that are part of a perimeter sensor system, and that optionally may include a barricade. The present invention, according to various embodiments, provides for: (1) an ability to detect chemical, biological, radiation, nuclear, and explosives materials when in general proximity; (2) an ability to transmit sensor data and alarms to a remote terminal or operations center; (3) establishing a data network with individual FIPS sensors associated with individual TCP/IP addresses to network-enable specific data analysis and communications with specific FIPS sensor units; (4) spectral data acquisition and analysis for identification of the CBRNE materials; and (5) an ability to communicate detector data via an internet connection between network-enabled radiation detectors and multiple users that can obtain detector data from individual detectors thereby providing a web-detector accessible by multiple remotely located users.

One embodiment of the invention includes gamma and neutron sensors that can be deployed in a distributed sensor network as part of a floating perimeter protection system. The gamma and neutron sensors are integrated into the FIPS unit and use wire-line and/or wireless communications between each of the FIPS units. The FIPS units could be deployed using an ad-hoc wireless network strategy to quickly establish a redundant path network to a remote terminal or operations center.

A wireless ad hoc network is a decentralized wireless network. The network is ad hoc because each node is willing to forward data for other nodes, and so the determination of which nodes forward data is made dynamically based on the network connectivity. This is in contrast to wired networks in which routers perform the task of routing. Network topology also could dynamically vary between nodes based at least on available communication links between nodes in an ad hoc network.

Figure 5:
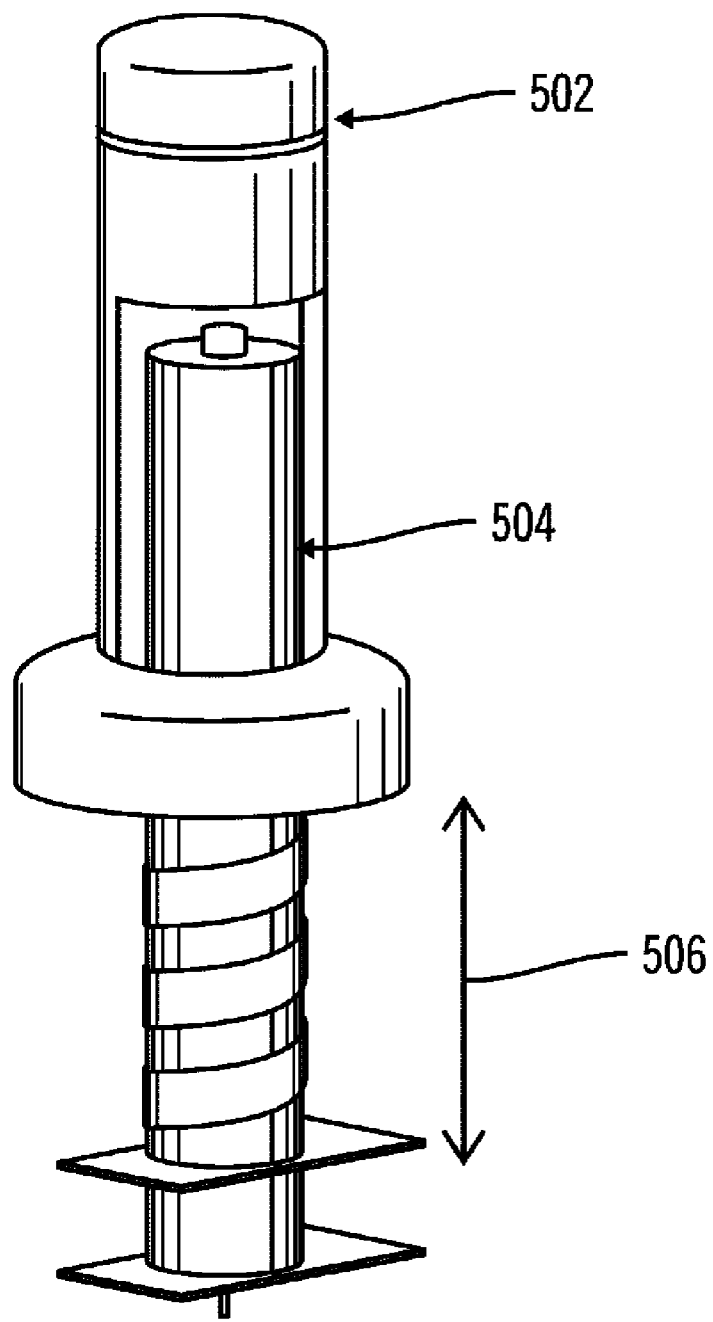
FIG. 5 is a pictorial representation of a moving piston power generation system useful for providing power to a floating intelligent perimeter sensor, in accordance with one embodiment of the present invention.

The FIPS unit 301 can be battery powered, such as with rechargeable batteries 306 (FIG. 3), with power generation systems to maintain extended operations. One such energy generation system 502 is electrically coupled to the sensor system, such as shown in FIG. 5. This example of a motion power generator 502 utilizes a free moving piston generator 504 that generates an electrical current from the motion 506 of the prime mover (piston) 504 of the generator. The piston is caused to move 506, according to one embodiment of the invention, by a float portion mechanically coupled to the piston portion and responsive to wave motion of the surrounding waters about the piston generator 504 and the FIPS unit 301 floating as a buoy. The generator is based on the principle of "electromagnetic induction" where an electric conductor is moved through a magnetic field thereby producing electric current. Solar panels (not shown) could also be used as a power generator. Alternatively, an ac or dc power connection, such as via electrical power network interconnection with individual FIPS units 301, can provide electric power to any of the individual FIPS units 301 from an external electrical power source.

Also, a combination of one or more moving piston generators 504, one or more solar panels, and optionally combined with other power generation technology implemented with the FIPS units 301, could be used to collectively maintain power generation to the one or more FIPS units and associated rechargeable batteries 306, under varying ambient weather and ocean wave conditions. For example, if solar energy is not available to provide power via one or more solar panels, the one or more moving piston generators 504 can supply electric energy to the one or more FIPS units and the one or more rechargeable batteries 306. Alternatively, if the water wave action is not available to provide enough motion to the one or more moving piston generators 504, and there is solar energy available, then the one or more solar panels can supply the electric energy. Additionally, according to one embodiment, the various power generators can be spread out about various FIPS units in a network and electrically interconnected such that electric power can be shared between individual FIPS units and respective associated rechargeable batteries 306. When a first FIPS unit 301 has sufficient power to recharge its one or more batteries 306 and power its electric requirements, excess electric energy can be distributed into the electrical interconnection power network to supply other FIPS units 301. In this way, as water wave action varies between locations of individual FIPS units 301 and available solar energy varies between locations of individual FIPS units 301, the cumulative electric power generation of all generators can be shared and distributed between the FIPS units that are electrically interconnected in an electrical power network.

Moreover, sensor data from individual FIPS units can be transmitted via the electrical power network interconnecting the various FIPS units. In this way, any of the FIPS units can include a communication controller that communicates with one or more Sensor Interface Units (SIUs) in the one or more FIPS units 301, and then the sensor data can be wirelessly transmitted to a remote monitoring system, such as via a network 216 (see FIG. 2)

The sensors are connected via a Sensor Interface Unit (SIU) that provides the calibration, automated gain control, calibration verification, remote diagnostics and connectivity to a processor for spectral analysis of the sensor data. A controllable power supply includes software controls that are controllable by a controller to adjust the power supplied to individual sensors and/or detectors, such as for calibration of the operation of these sensors and/or detectors. Analog signal from individual sensors and/or detectors is converted to digital data via at least one analog signal to digital data converter in the SIU. The sensor digital data from the SIU is communicated from the SIU to a network link 216 that communicates the network-enabled digital data with a digital data collection system 210. An example of the SIU is described in U.S. Pat. No. 7,269,527 entitled "System Integration Module for CBRNE Sensors", which is herein incorporated by reference.

Various sensors may also be shielded from electro-magnetic-interference (EMI). A data collection system, communicatively coupled with each sensor device, collects signals from the sensor devices. The collected data signals represent whether each sensor device has detected, for example, gamma or neutron radiation. Optionally, a remote monitoring system is communicatively coupled with the data collection system to remotely monitor the collected signals from the sensor devices and thereby, for example, remotely determine whether one or more gamma or neutron sensor devices from the array have provided gamma radiation data or neutron radiation data, and a spectral analysis system identifies the specific isotopes detected by the sensors, as will be more fully discussed below. A user interface provides sensor related data, such as a graphic presentation of the data from each sensor and/or group of sensors, the detection of radiation, and the identification of the one or more isotopes detected by the sensors.

Described now is an example of a FIPS unit capable of radiation detection and isotope identification, according to various embodiments of the present invention.

Figure 4:
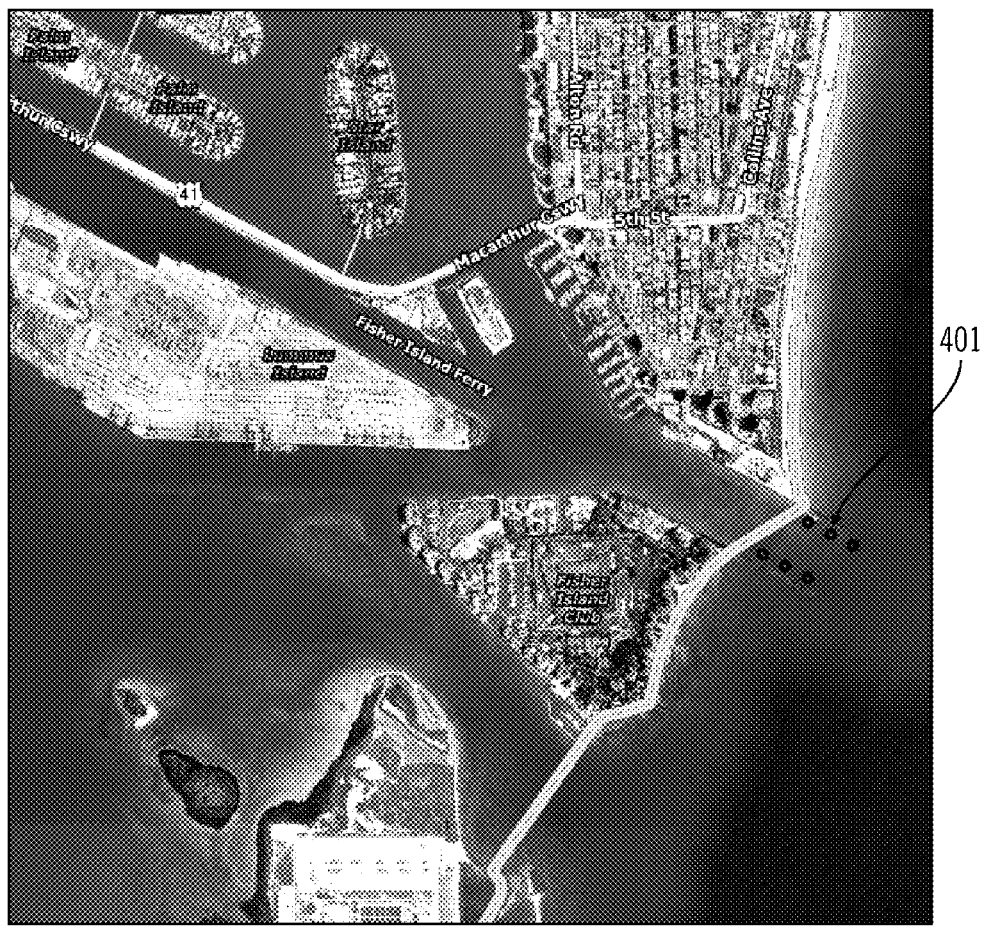
FIG. 4 is a pictorial representation of one example use of flotation devices for perimeter security with intelligent perimeter sensors units dispersed as part of a perimeter surveillance system, according to one embodiment of the present invention.

An example deployment of Floating Intelligent Perimeter Sensor (FIPS) units in a sensor and barrier system 100 is illustrated in FIG. 1. One or more FIPS units 101 are deployed at strategic locations in floating perimeter barriers 104 in the system 100. FIG. 4 shows a second example of a deployment of FIPS units 401, in this sensor system being deployed in a water channel or waterway.

Figure 2:
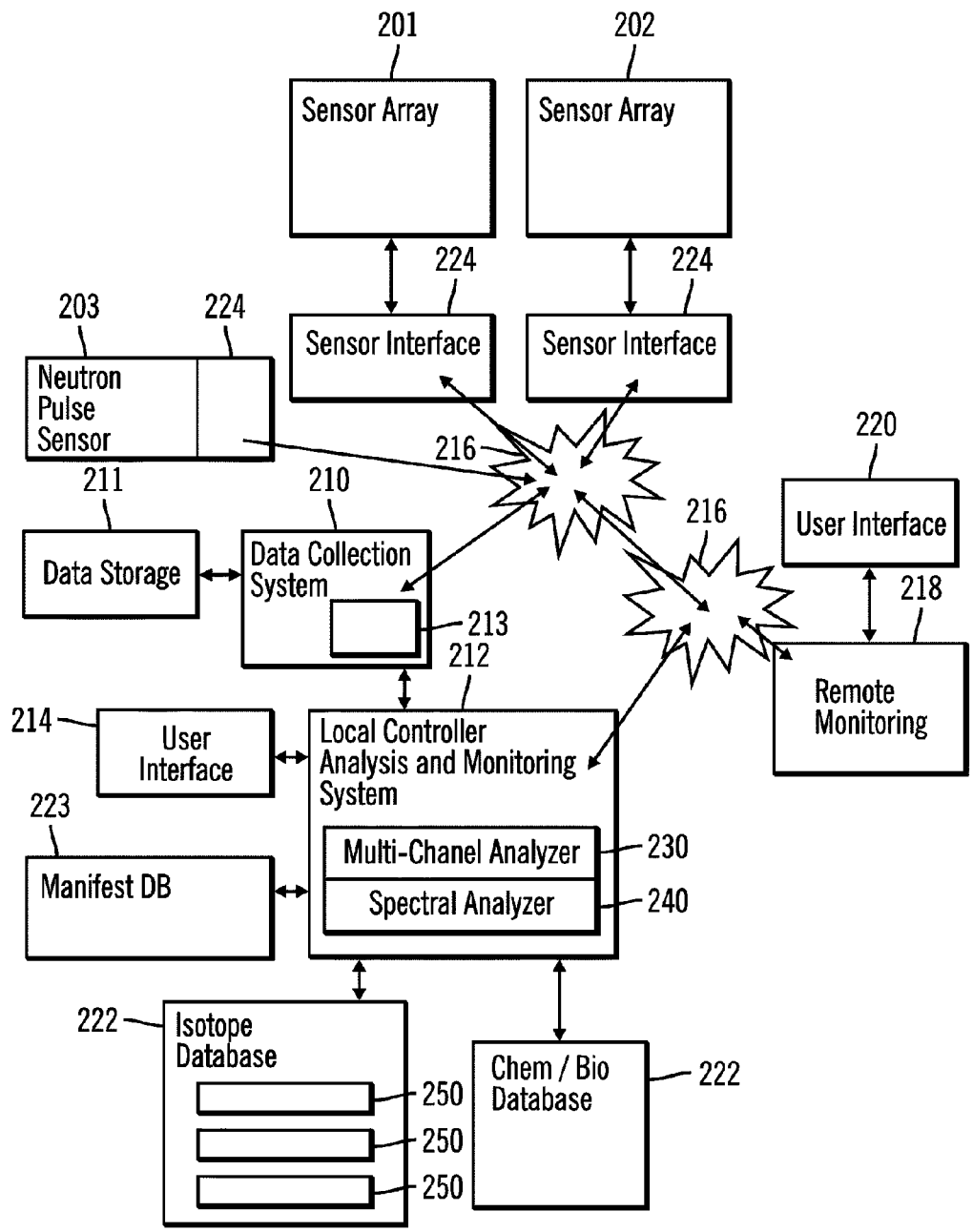
FIG. 2 is a block diagram illustrating a general overview of an example of a sensor system operating environment, according to one embodiment of the present invention.

With reference to FIG. 2, a data collection system 210, in this example, is communicatively coupled via cabling, wireless communication link, and/or other communication link 216 with each of the gamma radiation sensor devices 201 and neutron sensor devices 202 in each sensor unit. In one embodiment, one or more sensor units include neutron pulse sensor device(s) 202. The data collection system 210 includes an information processing system that communicates via a communication interface 213, and via the network 216, with data communication interfaces 224 that collect signals from the various radiation sensor units 201, 202, and the neutron pulse device(s) 203. The collected signals, in this example, represent detailed spectral data from each sensor device that has detected radiation.

The data collection system 210 is modular in design and can be used specifically for radiation detection and identification, and/or for data collection for explosives and special materials detection and identification. Additionally, it can be used for data collection for detection of chemicals and biological materials via respective sensors associated with the FIPS units.

The data collection system 210 is communicatively coupled with a local controller and monitor system 212. The local system 212 comprises an information processing system that includes a computer, memory, storage, and a user interface 214 such as a display on a monitor and a keyboard, or other user input/output device. In this example, the local system 212 also includes a multi-channel analyzer (MCA) 230 and a spectral analyzer 240.

The multi-channel analyzer (MCA) 230 comprises a device composed of many single channel analyzers (SCA). The single channel analyzer interrogates analog signals received from the individual radiation detectors 201, 202, and determines whether the specific energy range of the received signal is equal to the range identified by the single channel. If the energy received is within the SCA the SCA counter is updated. It should be noted that, according to one embodiment, a peak detector is incorporated into at least one gamma radiation detector to identify a detected energy range of radiation data from the detector. According to one embodiment, a peak detector is incorporated into the multi-channel analyzer 230 to identify a detected energy range of radiation data from one or more radiation detectors. Over time, the SCA counts are accumulated. At a specific time interval, the multi-channel analyzer 230 includes a number of SCA counts, which result in the creation of a histogram. The histogram represents the spectral image of the radiation that is present. The MCA 230, according to one example, uses analog to digital converters combined with computer memory that is equivalent to thousands of SCAs and counters and is dramatically more powerful and cheaper. Additionally, in one embodiment, the multi-channel analyzer uses a reference signal associated with the one or more gamma radiation detectors to adjust the collected spectral radiation detector data from the one or more gamma radiation detectors to obtain calibration of the collected spectral radiation detector data.

The histogram is used by the spectral analysis system 240, in one example, to identify isotopes that are present in materials in general proximity to the FIPS units. One of the functions performed by the information processing system 212 is spectral analysis, performed by the spectral analyzer 240, to identify the one or more isotopes, explosives or special materials. The spectral analysis system, according to one embodiment, comprises a pattern recognition system using spectral analysis to identify CBRNE materials. The spectral analysis system, according to one embodiment, comprises a static or dynamic background analysis and subtraction method for spectral analysis and/or peak detection methods used to identify CBRNE materials. According to one embodiment, the spectral analyzer includes a pulse shape differentiation method employed to filter noise from radiation detector data received from a neutron detector. With respect to radiation detection, the spectral analyzer 240 compares one or more spectral images of the radiation present to known isotopes that are represented by one or more spectral images 250 stored in the isotope database 222. By capturing multiple variations of spectral data for each isotope there are numerous images that can be compared to one or more spectral images of the radiation present. The isotope database 222 holds the one or more spectral images 250 of each isotope to be identified. These multiple spectral images represent various levels of acquisition of spectral radiation data so isotopes can be compared and identified using various amounts of spectral data available from the one or more sensors. Whether there are small amounts (or large amounts) of data acquired from the sensor, the spectral analysis system 240 compares the acquired radiation data from the sensor to one or more spectral images 250 for each isotope to be identified. This significantly enhances the reliability and efficiency of matching acquired spectral image data from the sensor to spectral image data of each possible isotope to be identified.

Once the one or more possible isotopes are determined present in the radiation detected by the sensor(s), the information processing system 212 can compare the isotope mix against possible materials, goods, and/or products, that may be present in a vessel under examination. Additionally, a manifest database 223 includes a detailed description of the contents of each known vessel that is to be examined. The manifest 223 can be referred to by the information processing system 212 to determine whether the possible materials, goods, and/or products, contained in the vessel under examination match the expected authorized materials, goods, and/or products, described in the manifest 223 for the particular vessel under examination. This matching process, according to an embodiment of the present invention, is significantly more efficient and reliable than any other monitoring process in the past.

The spectral analysis system 240, according to an embodiment, includes an information processing system and software that analyzes the data collected and identifies the isotopes that are present. The spectral analysis software consists of more than one method to provide multi-confirmation of the isotopes identified. Should more than one isotope be present, the system identifies the ratio of each isotope present. Examples of methods that can be used for spectral analysis such as in the spectral analysis software according to an embodiment of a container contents verification system, include: 1) a margin setting method as described in U.S. Pat. No. 6,847,731; and 2) a LINSCAN method (a linear analysis of spectra method) as described in U.S. Provisional patent application Ser. No. 11/624,067, filed on Jan. 17, 2006, by inventor David L. Frank, and entitled "Method For Determination Of Constituents Present From Radiation Spectra And, If Available, Neutron And Alpha Occurrences"; the collective entire teachings of which being herein incorporated by reference.

The user interface 214, for example, can present to a user a representation of the collected received returning signals, or the identified possible explosives and/or special materials in the shipping vessel under examination, or any system identified unauthorized explosives and/or special materials contained within the shipping vessel under examination, or any combination thereof.

The data collection system 210 can also be communicatively coupled with a remote control and monitoring system 218 such as via a network 216. The remote system 218 comprises an information processing system that has a computer, memory, storage, and a user interface 220 such as a display on a monitor and a keyboard, or other user input/output device. The network 216 comprises any number of local area networks and/or wide area networks. It can include wired and/or wireless communication networks. This network communication technology is well known in the art. The user interface 220 allows remotely located service or supervisory personnel to operate the local system 212 and to monitor the status of vessel verification by the collection of sensor units 201, 202 and 203 deployed at the FIPS units 101, 401.

Figure 3:
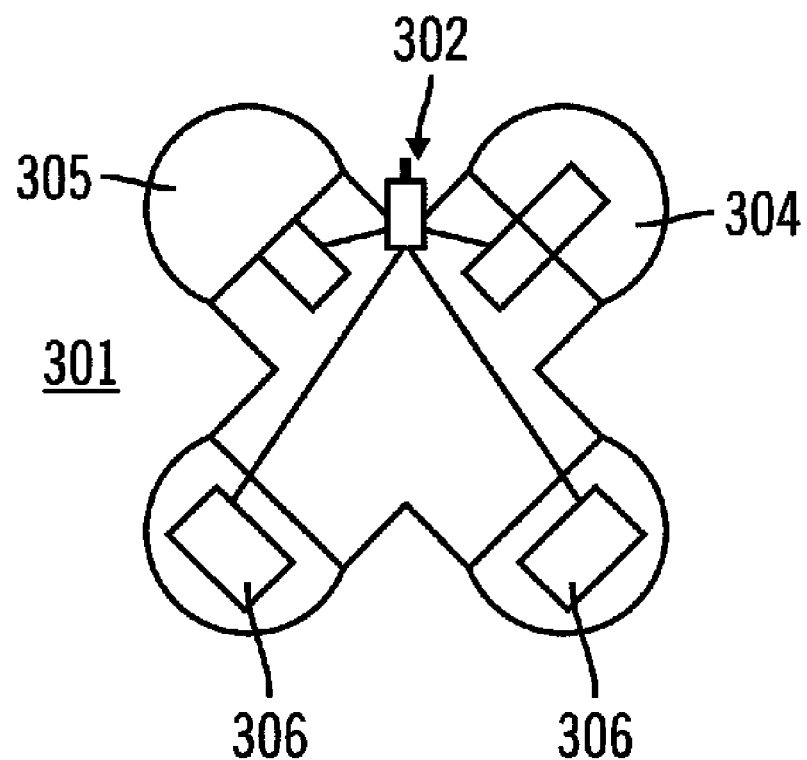
FIG. 3 is a block diagram showing one example of a sensor array arrangement for integration in a floating intelligent perimeter sensor, in accordance with one embodiment of the present invention.

Referring to FIG. 3, an example of a Floating Intelligent Perimeter Sensor unit 301 includes a gamma detector 305, a neutron detector and moderator 304, and supported by a sensor interface unit (SIU), a wireless communication device, and high voltage power unit, collectively referred to as module 302. The wireless communication device provides wireless communications via wireless communication link 216. The high voltage power unit provides for power, such as including for powering rechargeable batteries 306, for powering operations and functions of the FIPS unit 301.

By operating the system remotely, such as from a central monitoring location, a larger number of sites can be safely monitored by a limited number of supervisory personnel.

Various preferred embodiments of the present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

One embodiment, according to the present invention, can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, in certain embodiments, the computer readable medium may comprise computer readable information in a transitory state medium such as a network link and/or a network interface, including a wired network or a wireless network that allows a computer to read such computer readable information.

Additionally, the following patents are referenced and used as part of the collective teachings herein: 1) a method and system for analyzing the contents of a container as described in U.S. Pat. No. 7,005,982 "Carrier Security System"; and 2) a method and system for analyzing the contents of a container as described in U.S. Pat. No. 7,142,109 "Container Verification System for Non-Invasive Detection of Contents"; and 3) a method and system for analyzing the contents of a container as described in U.S. patent application Ser. No. 11/564/193 "Multi-Stage System for Verification of Container Contents"; the collective teachings of which being herein incorporated by reference.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A floating intelligent perimeter sensor system comprising:
   at least one buoy that floats when deployed in a waterway;
   one or more gamma radiation detectors mechanically coupled with the buoy for detecting gamma radiation present in a detection area about the buoy;
   one or more neutron detectors mechanically coupled with the buoy for detecting neutron radiation present in a detection area about the buoy;
   an analog signal to digital data converter, communicatively coupled with at least one of the one or more gamma radiation detectors and the one or more neutron detectors;
   a communications device, communicatively coupled with the analog signal to digital data converter, to communicate digital data from at least one of the one or more gamma radiation detectors and the one or more neutron detectors to a communications network;
   a power supply, electrically coupled with the at least one of the one or more gamma radiation detectors and the one or more neutron detectors, to supply power to the at least one of the one or more gamma radiation detectors and the one or more neutron detectors, and the power supply including software controls that are controllable by a controller to adjust the power supplied to individual detectors for calibration of operation thereof;
   a digital data collection system, communicatively coupled with the detectors, for collection of spectral radiation detector data from the detectors;
   a multi-channel analyzer system, communicatively coupled with the digital data collection system, for preparing histograms of the collected spectral radiation detector data;
   a spectral analysis system, communicatively coupled with the multi-channel analyzer system and the digital data collection system, for receiving and analyzing detector data including the collected spectral radiation detector data and the histograms to detect and to identify one or more chemical, biological, radiation, nuclear, and/or explosives (CBRNE) materials that are present within a detection area about the buoy;
   a first data storage means for storing data representing CBRNE spectra for use by the spectral analysis system, where one or more spectral images stored in the first data storage unit represent one or more isotopes, the first data storage means being communicatively coupled with the spectral analysis system;
   an information processing system, communicatively coupled with the spectral analysis system, for analyzing the identified one or more CBRNE materials to determine possible materials or goods that they represent; and
   a second data storage means for storing data representing a manifest relating to a known vessel under examination, the second data storage means being communicatively coupled with the information processing system, the information processing system further for comparing the determined possible materials or goods with a manifest relating to the known vessel under examination to determine if there are unauthorized materials or goods contained within the known vessel under examination.

2. The floating intelligent perimeter sensor unit of claim 1, further comprising:
   one or more rechargeable batteries for providing electric power to the one or more gamma radiation detectors and the one or more neutron detectors; and
   at least one power generation system, electrically coupled with the one or more rechargeable batteries, for providing electrical power to the one or more rechargeable batteries and to the one or more gamma radiation detectors and the one or more neutron detectors.

3. The floating intelligent perimeter sensor unit of claim 2, wherein the at least one power generation system includes any of
   one or more solar cells,
   one or more motion power generators, and
   an ac or dc power connection with an external electrical power source.

4. The floating intelligent perimeter sensor system of claim 1, wherein the one or more gamma radiation detectors and the one or more neutron detectors being for detection and identification of radioactive and/or fissile materials.

5. The floating intelligent perimeter sensor system of claim 1, further comprising one or more chemical and/or biological detectors for the detection and identification of chemical and/or biological materials in a detection area about the at least one buoy.

6. The floating intelligent perimeter sensor system of claim 1, further comprising one or more explosives detectors for detection and identification of explosives materials in a detection area about the at least one buoy.

7. The floating intelligent perimeter sensor system of claim 1, further comprising a wireless and/or wire-line communications system to transport network-enabled spectral radiation detector data to the digital data collection system.

8. The floating intelligent perimeter sensor system of claim 7, further comprising an internet connection to network-enabled radiation detector to provide a web-detector where multiple users can remotely connect to network-enabled radiation detector via the web-detector to obtain detector data.

9. The floating intelligent perimeter sensor system of claim 1, wherein the multi-channel analyzer system uses a reference signal associated with the one or more gamma radiation detectors to adjust the collected spectral radiation detector data from the one or more gamma radiation detectors to obtain calibration of the collected spectral radiation detector data.

10. The floating intelligent perimeter sensor system of claim 1, wherein the spectral analysis system analyzes the collected spectral radiation detector data and the histograms to detect radiation and to identify one or more isotopes associated with the detected radiation by using software on a computer program product.

11. The floating intelligent perimeter sensor system of claim 1, further comprising at least one sensor interface unit communicatively coupled with the one or more gamma radiation detectors and the one or more neutron detectors, and further communicatively coupled via a network with a server to enable access to detector data by multiple users.

12. The floating intelligent perimeter sensor system of claim 1, wherein the communications device comprises a TCP/IP interface for TCP/IP communications with the communications network.

13. The floating intelligent perimeter sensor system of claim 1, wherein a peak detector is incorporated into at least one detector of the one or more gamma radiation detectors to identify a detected energy range of radiation data.

14. The floating intelligent perimeter sensor system of claim 1, wherein the spectral analysis system includes a pulse shape differentiation method employed to filter noise from radiation detector data received from a neutron detector.

15. The floating intelligent perimeter sensor system of claim 1, wherein a peak detector is incorporated into the multi-channel analyzer to identify a detected energy range of radiation data.

16. The floating intelligent perimeter sensor system of claim 1, wherein the spectral analysis system comprises a pattern recognition system using spectral analysis to identify CBRNE materials.

17. The floating intelligent perimeter sensor system of claim 1, wherein the spectral analysis system comprises at least one of a static and dynamic background analysis and subtraction method for spectral analysis and/or peak detection methods used to identify CBRNE materials.

18. The floating intelligent perimeter sensor system of claim 1, further comprising one or more sensor interface units, communicatively coupled with the one or more gamma radiation detectors and the one or more neutron detectors, to provide sensor interface, digital data conversion, data calibration, and sensor support functions.

19. The floating intelligent perimeter sensor system of claim 1, wherein the floating intelligent perimeter sensor system is used to inspect boats or vessels in a detection area about the at least one buoy.

20. The floating intelligent perimeter sensor system of claim 1, wherein the floating intelligent perimeter sensor system is used at any of: military checkpoints, metropolitan area check points, power plants, oil refineries, storage and distribution facilities, and government facilities.

21. The floating intelligent perimeter sensor system of claim 1, wherein the communications device uses ad hoc wireless communications for communications with the communications network.

22. A method, with a floating intelligent perimeter sensor, for detecting hazardous materials in a detection area about the sensor, the method comprising:

floating in a waterway at least one floating intelligent perimeter sensor (FIPS);
detecting, with the FIPS, at least one of gamma radiation and neutron radiation present in a detection area about the FIPS, the detected at least one of gamma radiation and neutron radiation being associated with a vessel under examination in the waterway;
collecting digital data representing at least one spectral image of the detected at least one of gamma radiation and neutron radiation;
spectrally analyzing and comparing the at least one spectral image to one or more spectral images representing one or more isotopes;
determining, based on the spectrally analyzing and comparing, whether one or more isotopes are present in the detection area;
determining whether these isotopes present in the detection area are associated with any known hazardous materials; and
determining whether the vessel under examination is unauthorized to transport materials or goods comprising the any known hazardous materials.

23. The method of claim 22, further comprising:
collecting, with the FIPS, digital data from one or more CBRNE sensors associated with the FIPS, the collected digital data representing at least one spectral image;
spectrally analyzing and comparing the at least one spectral image to one or more spectral images associated with known CBRNE materials;
determining, based on the spectrally analyzing and comparing, whether one or more known CBRNE hazardous materials are present in the detection area; and
determining whether the vessel under examination is unauthorized to transport materials or goods comprising any known CBRNE hazardous materials.

* * * * *